2 Sheets—Sheet 1.

P. J. PAULY.

MANUFACTURE OF JAIL-BARS.

No. 178,460. Patented June 6, 1876.

ATTEST:
Robert Burns
H. Hutchins

INVENTOR:
Peter J. Pauly
By Knight Bros
Attys.

2 Sheets—Sheet 2.

P. J. PAULY.
MANUFACTURE OF JAIL-BARS.

No. 178,460. Patented June 6, 1876.

ATTEST:

INVENTOR:

UNITED STATES PATENT OFFICE.

PETER J. PAULY, OF ST. LOUIS, MISSOURI.

IMPROVEMENT IN THE MANUFACTURE OF JAIL-BARS.

Specification forming part of Letters Patent No. 178,460, dated June 6, 1876; application filed February 2, 1876.

*To all whom it may concern:*

Be it known that I, PETER J. PAULY, of the city and county of St. Louis, and State of Missouri, have invented a new and useful Improvement in Jail-Bars, which improvement is fully set forth in the following specification, reference being had to the accompanying drawings.

My improvement relates to a new construction of steel bar, to be used in formation of jail-cells; and consists in a bar made hard upon each edge and annealed at the middle, so that the edges will resist the action of any cutting or abrading instrument, and the middle will resist injury to the bar from concussion.

Figure 1:
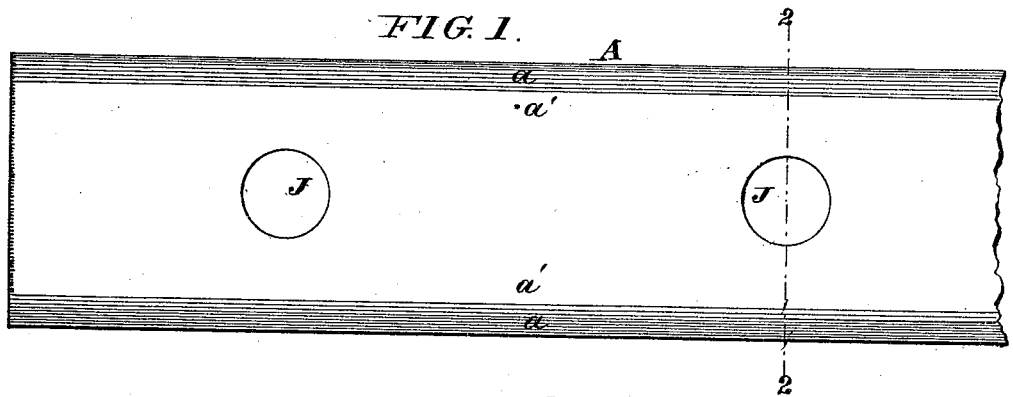
Figure 2:
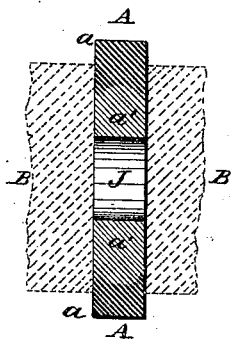
Figure 4:
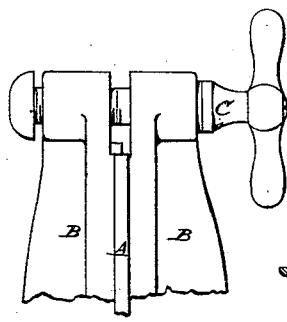
Figure 3:
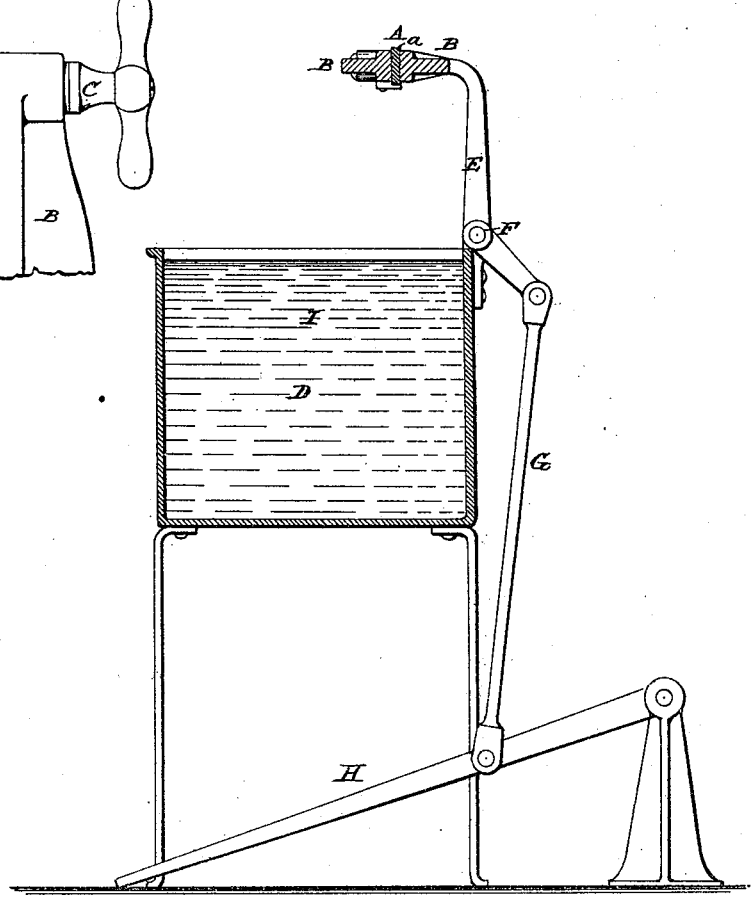

Figure 1 represents a jail-bar of my improved construction. Fig. 2 is a cross-section of the bar. Fig. 3 shows the tempering apparatus in cross-section. Fig. 4 is a top view of one end of the tempering-frame enlarged from Fig. 3.

The bar A is formed of steel, so as to admit of being hardened in any part, so as to prevent cutting action being had upon it by any steel stool, such as saw, drill, or file.

When a steel bar is hardened throughout it may be broken in pieces by a sharp blow of sufficient force, and is consequently worthless for the purpose. To meet the difficulty the bars have been made partly of steel and partly of iron, the steel exterior covering an interior plate of wrought-iron, which, of course, remained unaffected by the hardening process, and consequently prevented the bar from being broken by concussion. This construction is expensive, and does not meet the difficulties as fully as they are met by my improved bar, which is no more expensive than a simple steel bar.

In my improved bar the edge $a$ is hardened and the central part $a'$ annealed by the process and apparatus which I will now describe.

The bar A, when heated to a bright cherry-red, is placed between the straight bars B B of the dipping-frame. Those faces of the bars B which are in contact with the bar A are made somewhat narrower than said bar, so that a little of each edge of the bar A is exposed, to come directly in contact with the water in the dip-trough D. The frame-bars are clamped upon the bar A by end screws C, or by any other suitable means. One of the bars B is attached to a lever, E, fulcrumed to the side of the trough at F, and its lower end connected by a rod, G, to a hand-lever, H, as shown, so that by the movements of the hand-lever the bars A and B B may be submerged in the water I, or raised therefrom. J, Fig. 1, shows a rivet-hole in the bar. The effect of the immersion in water under these circumstances is to render the edges $a$ very hard, so that the hardest saw or file can have little effect upon them, and the middle $a'$ is left soft, so that it may be punched for the rivets, by which the bars are attached at the intersections, and will prevent fracture by concussion. The bars A are so tightly clamped between the bars B B that they do not warp in the hardening.

In hardening the ordinary jail-cell bars composed of mixed iron and steel, they become more or less warped, and the temper has to be let down to admit of the straightening of the bars by hammering.

By my process the edges of the bar are left very hard, as they remain straight during the hardening process owing to the support of frame B B.

I claim—

1. As a new article of manufacture, a jail-bar constructed in one piece of steel, with hardened edges $a$ and annealed center $a'$, as and for the purposes set forth.

2. The dipping apparatus, consisting of jaws B and screws C, adapted to hold the bar and prevent it warping, and suitable operating connections, as and for the purpose set forth.

PETER J. PAULY.

Witnesses:
SAML. KNIGHT,
ROBERT BURNS.